United States Patent [19]

Pace

[11] 3,938,470

[45] Feb. 17, 1976

[54] MOVABLE SUPPORTING DEVICE FOR MILKING APPARATUS

[76] Inventor: J. Don Pace, 1420 Brown Circle, Boulder, Colo. 80303

[22] Filed: Mar. 25, 1974

[21] Appl. No.: 454,571

[52] U.S. Cl............................ 119/14.1; 119/14.08
[51] Int. Cl.² ............................................. A01J 7/00
[58] Field of Search............ 119/14.1, 14.08, 14.13, 119/14.27, 14.45; 248/377, 382, 128, 138, 131, 145, 130, 13

[56] References Cited
UNITED STATES PATENTS

| | | | |
|---|---|---|---|
| 2,967,433 | 1/1961 | Phillips | 248/13 |
| 3,603,292 | 9/1971 | Finch | 119/14.1 |
| 3,605,694 | 9/1971 | Thomas et al. | 119/14.1 |

Primary Examiner—Louis G. Mancene
Assistant Examiner—Peter K. Skiff

[57] ABSTRACT

A movable supporting device is disclosed for milking apparatus that includes a plurality of arms that are readily movable to position a claw during milking of a cow. A pair of spaced support arms are connected between vertically spaced pivots and the spaced arms have an angularly positioned spring therebetween. The two spaced arms are equal in length and joined to the pivots so that a pair of linking arms joined by an additional pivot are maintained horizontal regardless of the movement of the arms. In addition, a locking mechanism is shown connected adjacent to the vertically spaced pivots for locking the spaced arms in position when desired. A second pair of spaced support arms may also be utilized between the first pair of spaced arms and the linking arms. The milking claw is attached to the free end of the outer linking arm and since the device is movable in both horizontal and vertical axes, the claw can be readily moved as needed to facilitate milking of a cow. An automatic retraction device is also disclosed wherein hydraulic cylinders are utilized to move the arms upwardly and to rotate and fold the same with the upward movement being initially limited after a predetermined distance until the rotational and folding movement has progressed a predetermined distance.

19 Claims, 13 Drawing Figures

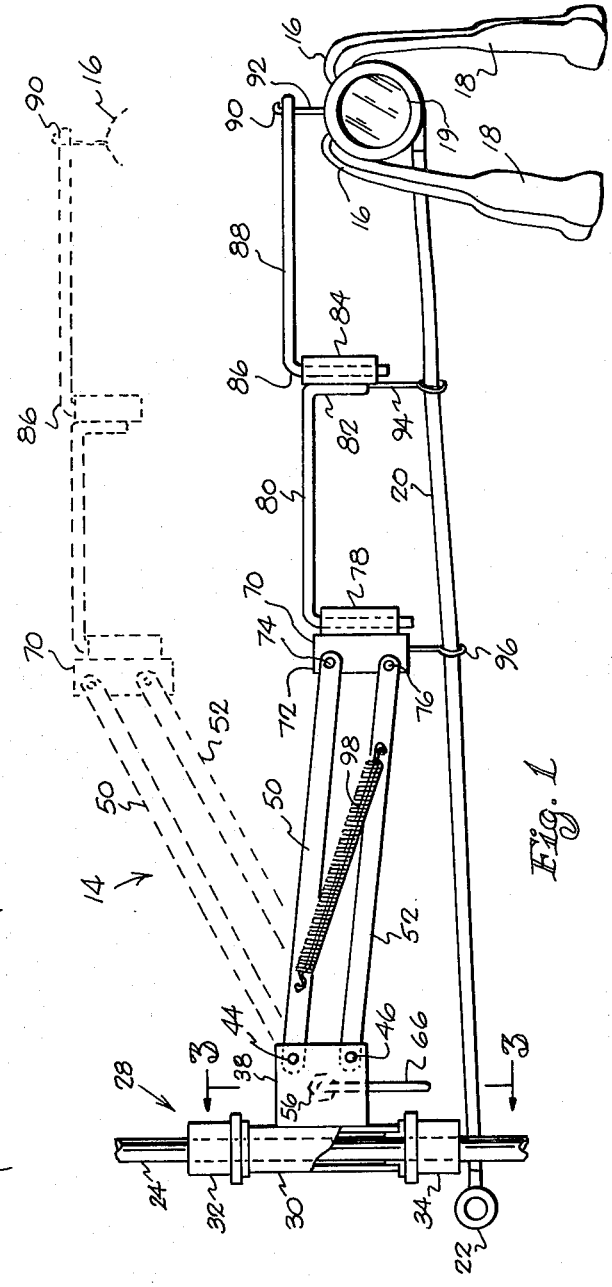
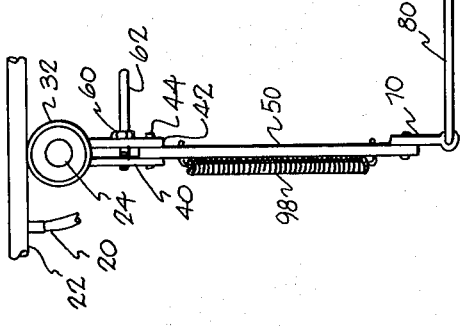
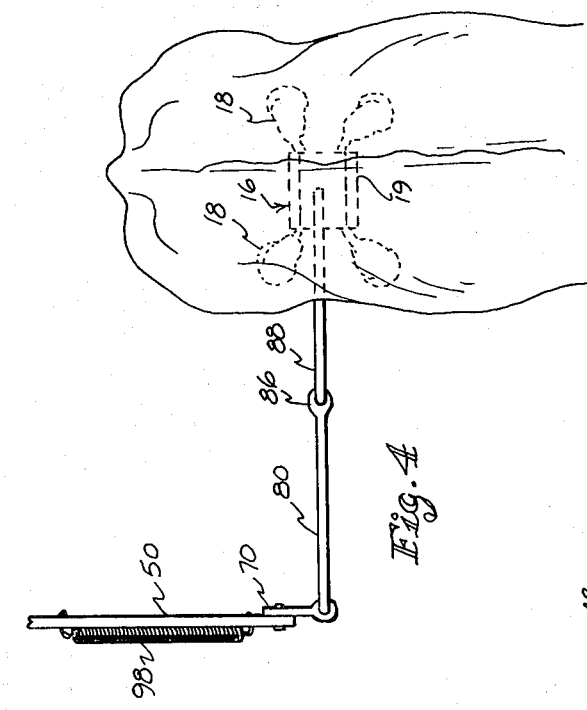
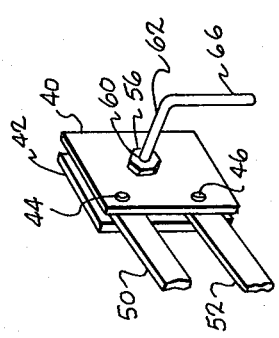
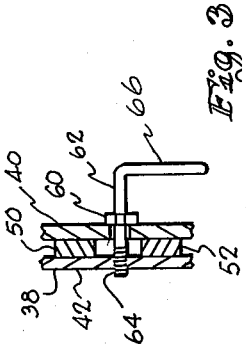

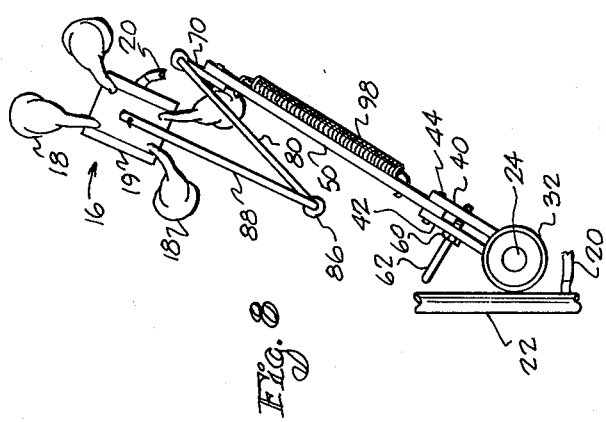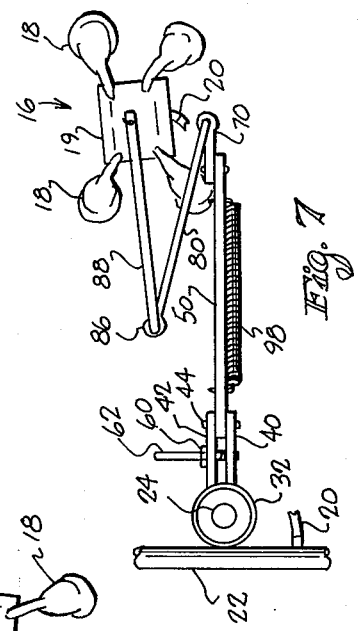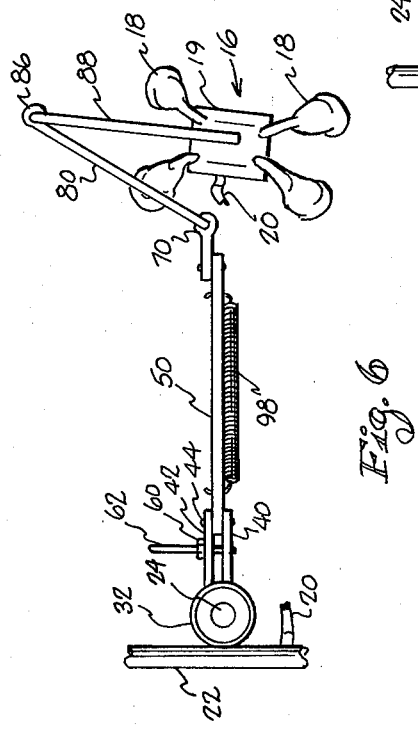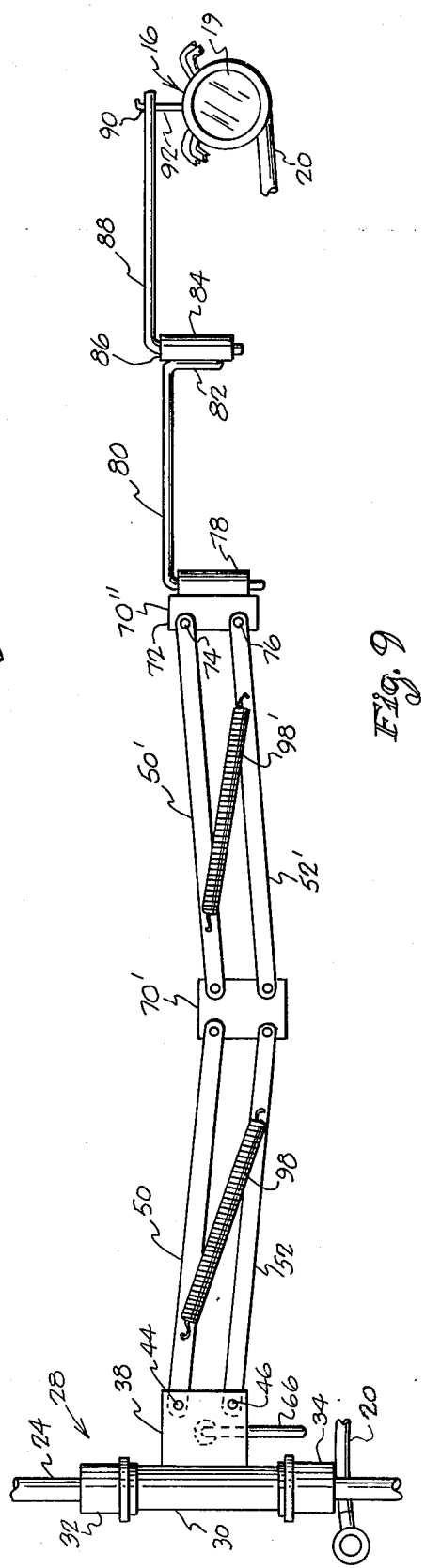

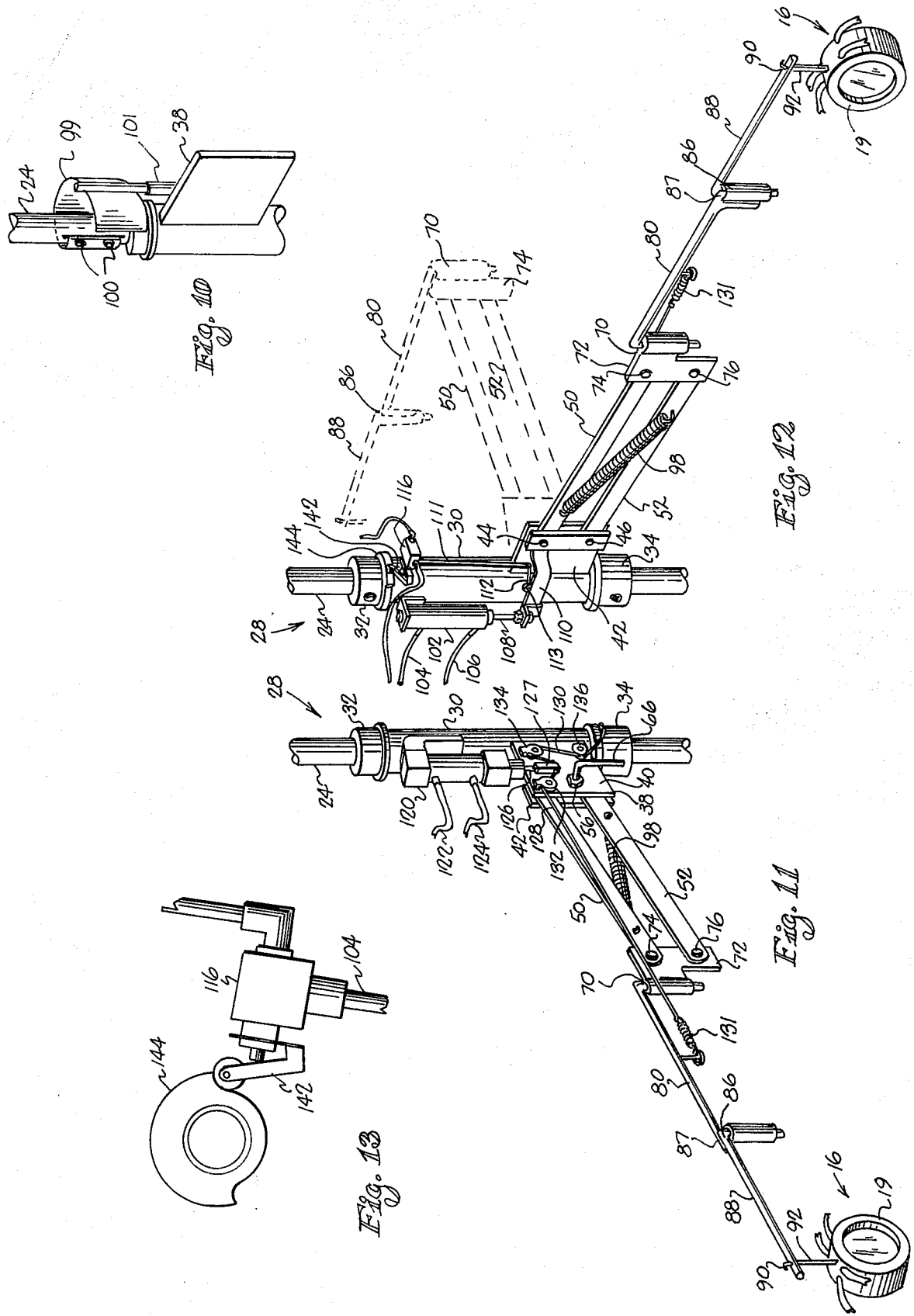

MOVABLE SUPPORTING DEVICE FOR MILKING APPARATUS

FIELD OF THE INVENTION

This invention relates to a movable supporting device and more particularly relates to a movable supporting device for a milking apparatus.

BACKGROUND OF THE INVENTION

With the advent of the automatic milking machine, it has become necessary or at least desirable to support various components of the machine in order to facilitate milking and/or protect the animal to be milked from injury or undue annoyance. While many devices have been suggested and/or utilized heretofore for supporting various components, no such device has been successful heretofore in providing adequate support for the milking claw while still providing the necessary degree of flexability to allow the claw to be moved to follow movement of the cow during milking. Heretofore, it has been common either to provide minimal or no support for the milking claw or to provide a support with little flexibility and has not produced the most efficient results. While a few attempts have been made to provide a movable support for the milking claw, these supports have not allowed the degree of movement necessary.

While some of the prior art devices have utilized linking arms at least to some degree in providing support for the milking claw, such linking arms have not proved to be completely acceptable for the intended purposes and, more particularly, have not allowed the flexability desired and/or necessary. In addition, none of the supporting or linking arms heretofore suggested or utilized have included spaced parallel arms in attempting to achieve the desired result and none have provided a locking mechanism for such arms.

It has also been found desirable that the milking claw be withdrawn from the immediate milking area after milking has been completed. While various devices have also been suggested and/or utilized for causing retraction of the claw when the end of milking is signalled, these devices have likewise failed to be completely successful in accomplishing the intended purpose in an economical and dependable manner. In addition, none of the known devices cause retraction of the milking device by lifting, folding and rotating the device by means of separate actuating means.

SUMMARY OF THE INVENTION

This invention provides an improved movable supporting device for milking apparatus that is economical yet dependable and provides a high degree of flexibility. The device includes one or more pairs of spaced parallel arms which may be locked in position and which maintain linking arms horizontally oriented regardless of movement of the spaced arms and hence, allow a milking claw attached to the linking arms to be readily moved as needed or desired. The device of this invention also includes an automatic retraction system that causes the arms to be lifted, folded and rotated by means of separate actuators to quickly and safely remove the milking claw from the immediate milking area.

It is therefore an object of this invention to provide an improved supporting device.

It is another object of this invention to provide an improved movable supporting device for milking apparatus.

It is still another object of this invention to provide an improved supporting device for milking apparatus that includes a pair of spaced parallel arms.

It is still another object of this invention to provide an improved movable supporting device for milking apparatus that is adapted to receive and support a milking claw and allow the same to be readily moved as needed or desired.

It is still another object of this invention to provide an improved movable supporting device for milking apparatus that includes a pair of linking arms supporting a milking claw and one or more pairs of spaced parallel arms maintaining said linking arms in horizontal position regardless of movement of the spaced arms.

It is still another object of this invention to provide an improved device for milking apparatus that includes a locking mechanism for holding a pair of spaced parallel arms in a desired position.

It is another object of this invention to provide an improved movable supporting device for milking apparatus that includes automatic retraction means.

It is still another object of this invention to provide an improved movable supporting device for milking apparatus that includes a retraction system having a pair of actuators one of which causes the arms of the device to be lifted and the other of which causes the arms to be folded and rotated.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a side view showing the improved movable supporting device of this invention and illustrating in dotted lines, how the device can be lifted and rotated as desired;

FIG. 2 is a perspective view showing in greater detail the pivot and locking means utilized with the spaced parallel arms included in this invention;

FIG. 3 is a cross-sectional view of the pivot and locking means taken across line 3—3 of FIG. 1;

FIG. 4 is a top view showing typically the improved supporting device of this invention positioned for milking of a cow;

FIGS. 5 through 8 are top views illustrating how the improved supporting device of this invention as shown in FIG. 1 can be manually folded and retracted;

FIG. 9 is a partial side view showing an alternate embodiment of the supporting device of this invention utilizing dual pairs of spaced parallel arms;

FIG. 10 is a partial perspective view showing an alternate embodiment of the supporting device of this invention wherein a rotational bias is included;

FIG. 11 is a perspective view showing one side of the improved milking apparatus of this invention having automatic retracting means incorporated therein;

FIG. 12 is a perspective view showing the opposite side of the improved milking apparatus as shown in FIG. 11 and having automatic retracting means incorporated therein; and FIG. 13 is a partial top view of the switch and cam mechanism shown in FIG. 12.

DESCRIPTION OF THE INVENTION

Referring now to the drawings, the movable supporting device 14 of this invention is shown in FIG. 1 supporting a conventional milking claw 16 having conventional milking, or teat, cups 18 attached to bowl 19 with the output from the bowl being conducted through tube 20 to central milking line 22 leading to a central collecting station (not shown), as is conventional.

Supporting device 14 is supported by a stationary supporting structure such as, for example, column 24 which can be a vertical column fixed to a frame and/or floor in conventional manner. As shown in FIG. 1, a first pivot means 28 includes a collar portion 30 that surrounds support column 24 and is constrained to rotation thereabout by means of stops 32 and 34 fastened to column 24 above and below collar 30. As also shown in FIG. 1, a vertically positioned plate unit 38 is connected to collar 30 and extends outwardly from the central portion thereof. As shown best in FIGS. 2 and 3, plate unit 38 includes two spaced plates 40 and 42 having upper and lower pivots 44 and 46 therein. A pair of spaced parallel arms 50 and 52 are connected to pivots 44 and 46, respectively, so that arms 50 and 52 pivot about horizontal axes.

As also shown in FIGS. 2 and 3, a lock mechanism 56 is provided at plate unit 38 for locking arms 50 and 52 in any predetermined position. Locking mechanism 56 includes a nut 60 fixed to shaft 62 extending through plate unit 38 with the threaded end 64 of shaft 62 being received in an internally threaded aperture in rear plate 42. Shaft 62 preferably terminates in a conventional manner to facilitate rotation of shaft 62, such as, for example, by an L-shaped end portion 66 (as shown) or by a T-shaped end portion or knob (not shown). Rotation of the shaft in one direction causes plates 40 and 42 to be drawn toward one another to lock arms 50 and 52 in position therebeteen and rotation in the opposite direction allows the plates to increase the spacing therebetween to free arms 50 and 52 for pivoting.

As shown in FIG. 1, arms 50 and 52 are preferably of equal length and are maintained in spaced parallel relationship with the outward ends of arms 50 and 52 being connected to a second pivot 70 and more particularly to vertical plate 72 thereof at pivots 74 and 76, respectively. Pivots 74 and 76 preferably have a spacing therebetween equal to the spacing between pivots 44 and 46.

A collar 78 is connected to plate 72 of pivot 70 and has a vertical opening therein through which one of L-shaped linking arm 80 is received. The other end of L-shaped linking arm 80 has a short downwardly directed flange 82 thereon to facilitate connection to collar 84 of an additional pivot 86. Collar 84, like collar 78, has a vertical opening therein to receive a second L-shaped linking arm 88 the free end of which has an aperture 90 therein to receive hangar 92 of milking claw 16 to thus provide support for the milking claw.

As also shown in FIG. 1, hangars 94 and 96 may also be provided as desired to support milk line 20 and keep the same from making gound, or floor, contact. In addition, a spring 98 is connected between the spaced parallel arms 50 and 52. As shown in FIG. 1, spring 98 is preferably angularly connected with the two spaced parallel arms. Spring 98 neutralizes the gravity forces and is selected so that the arms will remain in position so long as no external force is placed thereto.

As can be seen from FIG. 1, arms 50 and 52 can be moved upwardly or downwardly and can be rotated by rotating collar 30 so that the milking claw can be moved as needed to follow a cow as the cow moves during milking. FIG. 4 illustrates typically how the supporting device might be oriented during milking. After milking is completed, the arm can be manually raised and/or rotated as desired and this is illustrated in dotted lines in FIG. 1. As indicated, raising and/or rotating of the support device does not effect the horizontal orientation of linking arms 80 and 88, and it is a feature of this invention that arms 80 and 88 are maintained in a horizontal position regardless of the movement of arms 50 and 52.

As shown in FIGS. 5 through 8, the supporting device shown in FIG. 4 (and shown without the presence of a cow in FIG. 5) may be manually rotated as desired, for example, by rotating arm 88 with respect to arm 80 (FIG. 6), and arm 80 may be rotated with respect to arms 50 and 52 to thus fold the supporting device as shown in FIG. 7. As shown in FIG. 8, the entire folded structure may then be rotated out of the way as desired. It is to be realized, of course, that FIGS. 4 through 8 are merely illustrative of one movement that can be accomplished with the device of this invention and the invention is not meant to be limited thereto.

As shown in FIG. 9, a second pair of spaced parallel arms 50' and 52' may be utilized if desired or needed. When utilized, arms 50' and 52' are connected at opposite ends to pivot about points 70' and 70'' in the same manner as shown in FIG. 1 for pivoting of arms 50 and 52 on pivot plate 72 at pivots 74 and 76. A spring 98' can also be utilized if desired or needed.

FIG. 10 illustrates an additional embodiment wherein rotational bias or tensioning is applied to the supporting device as needed or desired. As shown, a spring 99 is fastened as by screws 100 to column 24 and is spirally wound thereabout so that an upstanding flange 101 on plate unit 38 contacts the spring as the plate unit is rotated in one direction (counterclockwise as shown) to place increasing bias thereon, the bias being decreased and thus eliminated as the plate unit is rotated in the opposite direction (clockwise as shown). The spring 99, as shown in FIG. 10, can be modified as desired, as by a coiled wire spring, for example, and could be replaced by drag friction, for example, through the use of washers or the like in conventional fashion.

Referring now to FIGS. 11 through 13, an automatic retraction device is shown incorporated into the movable supporting device. As shown, in FIG. 11, column 24 supports the device of this invention and has sleeve 30 thereabout and constrained to rotation between stops 32 and 34. In addition vertical plate unit 38, which includes plates 40 and 42, is still utilized to pivot arms 50 and 52 about vertical axes and mechanical locking means 56 is also utilized in the same manner as described hereinabove with respect to the embodiment shown in FIG. 1, except that the locking mechanism preferably has a maximum amount of friction that can be imposed so that the friction can be overcome by the automatic retraction device. This can be accomplished, for example, by providing a spring washer (not shown) between nut 60 and plate 40 and a rotation limit (not shown) in plate 40 to limit the rotation of shaft 62. Also, pivot 70 is utilized with plate 72 pivoting arms 50 and 52 about pivots 74 and 76 in the same manner as described hereinabove with respect to FIG. 1, and linking arms 80 and 88 are likewise pivoted about vertical axes by means of pivots 70 and 86 in the same manner as described with respect to FIG. 1. As shown in FIGS. 11 and 12, a stop flange 87 may be provided at the end of arm 80 at pivot 86 to prevent movement of arm 88 in a clockwise direction about a pivot where the arm forms a straight line. Milking claw 16 is also shown connected to the end of linking arm 88 through aperture 90 in the same manner as described hereinabove with respect to FIG. 1, and spring 98 is utilized between arms 50 and 52, again in the same manner as described hereinabove with respec to FIG. 1.

The automatic retraction device incorporated in the embodiment shown in FIGS. 11 through 13 includes a hydraulic cylinder 102 having fluid pressure inlet lines 104 and 106 which may be conventionally connected to a pressure source (not shown). Hydraulic cylinder 102 is mounted on collar 30 as shown in FIG. 9 so as to be rotatable therewith. Cylinder rod 108 of hydraulic cylinder 102 is connected to arm 110 which in turn is connected to arm 50 with pivot 44 therebetween so that arms 50 and 110 pivot about pivot 44 (arms 50 and 110 may be integrally formed if desired). Thus, when cylinder rod 108 is depressed, arm 50 is pivoted upwardly. As arms 50 and 52 are pivoted upwardly, rod 111 having lever 112 thereon, which lever in turn has wheel 113 thereon, is rotated as wheel 113 contacts arm 110 as arm 110 moves due to movement of arms 50 and 52. Rotation of rod 111 causes limit switch 116 to be opened, limit switch 116 being mounted on collar 30. This causes a disruption of activation of hydraulic cylinder 102 by terminating pressure thereto and temporarily precludes further upward movement of arms 50 and 52 of the supporting apparatus.

A second hydraulic cylinder 120, having hydraulic lines 122 and 124 connected to a conventional pressure source (not shown), has a piston 126 which depresses line 130 with a clevis 127 thereon. Clevis 127 has one end of lines 128 and 130 connected thereto, with line 128 being connected at its other end to arm 80 through spring 131 and with line 130 (having some slack therein when line 128 is taut) connected at its other end to stop 34, with line 128 extending over pulley 132 and line 130 extending over pulleys 134 and 136. Thus, as clevis 127 on piston 126 is depressed by actuation of hydraulic cylinder 102, line 130 creates a pulling force on linking arm 80 and, after line 130 becomes taut, on stop 34 to cause arm 80 to be folded and then rotated counterclockwise (as shown in FIG. 11) in a horizontal plane. Limit switch 116 rotates along with collar 30 (which rotates as the supporting device arms are pulled counterclockwise) and cam follower 142 connected to limit switch 116 rides on cam 144 (fixed to column 24) so that the switch is again closed after rotation has proceeded a distance sufficient such that the cam follower is in contact with a raised portion of the cam (see FIG. 12). Limit switch 116 is closed by the cam mechanism only after rotation has proceeded far enough so that the cow being milked has been cleared, after which upward movement of arms 50 and 52 is resumed by again actuating hydraulic cylinder 102 by closing limit switch 116 by the cam mechanism. As shown by the dotted lines of FIG. 11, both upward movement and rotational movement then occurs to rotate arm 80 (which folds the arms because of pivot 70), rotate arms 50 and 52 (after folding has occurred), and move arms 50, 52, 80 and 88 upwardly. Thus, the milking arm is automatically retracted from the immediate area of milking. Although not shown, it is to be realized, of course, that cylinders 102 and 120 are preferably actuated in common and in conventional manner as, for example, by a signal from a flow sensor that milking has ceased and the milking apparatus should therefore be retracted. It is well known in the art to employ fluid flow sensors to sense the end of milking to automatically disconnect the teat cups 18 from the teats of the cow. This same signal can be utilized to actuate cylinders 102 and 120.

From the foregoing, it is to be appreciated that the device of this invention provides an improved movable supporting device that is particularly useful for milking apparatus and also provides a device that is particularly useful for automatic retraction of such a support and the milking apparatus connected therewith.

What is claimed is:

1. A movable supporting device for milking apparatus having a milking claw, said device comprising:
   a stationary support column;
   a first pivot means having a collar portion and a plate portion;
   a first arm having one end connected to said plate portion of said first pivot means so that said first arm pivots about a first predetermined axis;
   a second pivot means connected to the other end of said first arm;
   additional arm means having one end receiving and supporting said milking claw and the other end connected to said second pivot means to that said additional arm means pivots about a second predetermined axis that is substantially normal to said first predetermined axis regardless of movement of said first arm; and
   actuating means connected with said first and additional arms to control movement of the arms in at least one direction.

2. The movable supporting device of claim 1 wherein said stationary support column is vertically positioned, and where said additional arm means is maintained in a horizontal position regardless of movement of said first arm.

3. The movable supporting device of claim 1 wherein said device includes a parallel arm parallel to said first arm and connected between said first and second pivot means, and wherein said device also includes a spring connected between said parallel arms.

4. The movable support device of claim 3 wherein said device includes third pivot means and second movable means having a second pair of spaced arms, said third pivot means and said second movable means being connected between said first movable means and said second pivot means with said third pivot means connecting one end of each of said second pair of spaced arms with the other end of each of said pair of spaced arms of said first movable means and with the other end of each of said second pair of spaced arms being connected with said second pivot means.

5. The movable supporting device of claim 4 wherein said first and second movable means includes springs connected between said spaced arms of each of said movable means.

6. The movable supporting device of claim 1 wherein said additional arm means includes second and third arms and third pivot means connecting said second and third arms so that both arms pivot about axes substantially normal to said first predetermined axis.

7. The movable support device of claim 1 wherein said device includes locking means for locking said first arm in a predetermined position with respect to movement about said first predetermined axis.

8. A movable supporting device for milking apparatus having a milking claw, said device comprising:
 a vertical support column;
 a first pivot means including a collar surrounding said support column and a vertically positioned plate unit attached thereto;
 a pair of parallel spaced arms one end of each of which is connected to said plate unit to pivot about horizontal axes;
 a spring angularly connected between said parallel arms;
 a second pivot means connected to the other end of each of said parallel arms;
 a third arm one end of which is connected to said second pivot means so that said third arm is horizontally disposed;
 a fourth arm one end of which supports said milking claw; and
 a third pivot means connected between said third and fourth arms so that said fourth arm is horizontally disposed; said third and fourth arms being maintained in said horizontally disposed position regardless of movement of said parallel arms.

9. The movable support device of claim 8 wherein further including locking means connected with said first pivot means to releasably lock said parallel means against pivoting about said horizontal axes.

10. The movable supporting device of claim 8 wherein said device includes rotational biasing means responsive to relative rotational movement between said collar and said column in one predetermined direction to effect a bias therebetween in the opposite direction.

11. The movable supporting device of claim 10 wherein said rotational biasing means has a spring portion fixed to said columm and a spring contactable flange fixed to said collar, said spring and collar being positioned for contact during rotation in said one predetermined direction to cause said rotational bias to be applied.

12. A movable supporting and automatic retraction device for milking apparatus having a milking claw, said device comprising:
 stationary support means;
 first pivot means mounted on said stationary support means;
 first movable means including a pair of spaced arms connected at one end to said pivot means;
 second pivot means connected to the other end of said spaced arms;
 linking arm means having one end connected with said second pivot means and the other end receiving and supporting said milking claw whereby said apparatus may be readily moved;
 first actuating means for causing said first movable means to be moved in a first predetermined direction; and
 second actuating means for causing said first movable means and said linking arm means to be moved in a second predetermined direction substantially normal to said first predetermined direction whereby when actuated said first and second actuating means cause said arms to be automatically retracted.

13. The movable supporting and automatic retraction device of claim 12 wherein said device also includes means for limiting movement in said first predetermined direction until a predetermined amount of movement has occurred in said second predetermined direction and then causing resumption of said movement in said first predetermined direction after predetermined movement has occurred in said second predetermined direction.

14. The movable supporting and automatic retraction device of claim 12 wherein said movement in said first predetermined direction is vertical and wherein said movement in said second predetermined direction is rotation about a horizontal axis.

15. The movable supporting device of claim 12 wherein said device includes locking means connected with said first pivot means for frictionally locking said arms of said pivot movable means for a selected position, said locking means including limiting means for limiting the frictional force applied in locking said arms in a selected position whereby said means can overcome said applied frictional force to thereby move said arms from said selected position upon actuation of said actuators.

16. A movable supporting and automatic retraction device for milking apparatus, said device comprising:
 stationary support means;
 first pivot means mounted on said stationary support means;
 first movable means including a pair of spaced arms connected at one end to said pivot means;
 second pivot means connected to the other end of said spaced arms;
 linking arm means having one end connected with said pivot means and the other end adapted to receive and support predetermined milking apparatus whereby said apparatus may be readily moved;
 first actuating means for causing said first movable means to be moved in a first predetermined direction; second actuating means for causing said first movable means and said linking arms means to be moved in a second predetermined direction substantially normal to said first predetermined direction whereby when actuated said first and second actuating means cause said arms to be automatically retracted; and
 means for limiting movement in said first predetermined direction until a predetermined amount of movement has occurred in said second predetermined direction, said limiting movement means including a rod actuated by said movement in said first predetermined direction and a cam mechanism for causing the resumption of said movement in said first predetermined direction after predetermined movement has occurred in said second predetermined direction.

17. The movable supporting device of claim 16 wherein said limiting movement means includes cables the longitudinal movement of each of which is controlled by said second actuator, one of said cables being connected to said locking arm means with a spring connected therebetween, and the other of said collars being connected to said stationary support means.

18. A movable supporting and automatic retraction device for milking apparatus having a milking claw, said device comprising:

a vertical support column;

a first pivot means including a collar surrounding said support column and a vertical plate unit attached thereto;

a pair of parallel spaced arms one end of each of which is connected to said plate to pivot about vertical axes;

a spring angularly connected between said parallel arms;

a second pivot means connected to the other end of each of said parallel arms;

a third arm one end of which is connected to said second pivot means;

a fourth arm one end of which supports said milking claw;

a third pivot means connected between said third and fourth arms with said third and fourth arms being maintained in a horizontal position regardless of movement of said parallel arms;

a first hydraulic cylinder for causing said arms to be moved upwardly in a vertical direction when said first hydraulic cylinder is actuated;

a second hydraulic cylinder connected with one of said arms to cause said arms to be rotated about a horizontal axis when said second hydraulic cylinder is actuated; and limiting means for limited upward vertical movement of said arms after a predetermined amount of movement has occurred until after a predetermined amount of rotational movement has occurred whereby when said hydraulic cylinders are actuated said arms of said device are automatically lifted and retracted in a predetermined manner.

19. The movable supporting and automatic retraction device of claim 18 wherein said third arm has a stop thereon engageable with said fourth arm to prevent said fourth arm from rotating past a point forming a straight line with said third arm.

* * * * *